US010003264B2

(12) United States Patent
Uenaka et al.

(10) Patent No.: US 10,003,264 B2
(45) Date of Patent: Jun. 19, 2018

(54) DC/DC CONVERTER

(71) Applicant: Mitsubishi Electric Corporation, Chiyoda-ku (JP)

(72) Inventors: Mai Uenaka, Chiyoda-ku (JP); Yuta Komatsu, Chiyoda-ku (JP); Matahiko Ikeda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days. days.

(21) Appl. No.: 15/526,114

(22) PCT Filed: Dec. 21, 2015

(86) PCT No.: PCT/JP2015/085676
§ 371 (c)(1),
(2) Date: May 11, 2017

(87) PCT Pub. No.: WO2016/111156
PCT Pub. Date: Jul. 14, 2016

(65) Prior Publication Data
US 2017/0310219 A1    Oct. 26, 2017

(30) Foreign Application Priority Data

Jan. 8, 2015 (JP) .................... 2015-002339

(51) Int. Cl.
*H02M 3/158* (2006.01)
*H02M 1/08* (2006.01)
*H02M 1/00* (2006.01)

(52) U.S. Cl.
CPC ........... *H02M 3/1582* (2013.01); *H02M 1/08* (2013.01); *H02M 2001/0009* (2013.01)

(58) Field of Classification Search
CPC ................. H02M 3/1582; H02M 1/08; H02M 2001/0009

(Continued)

(56) References Cited

U.S. PATENT DOCUMENTS 9,007,040 B2 * 4/2015 Ikeda .................... H02M 3/158
  323/222
9,893,613 B1 * 2/2018 Nakada ................. H02M 3/142
(Continued)

FOREIGN PATENT DOCUMENTS

JP    2013-192383 A    9/2013
JP        5457559 B2    4/2014
(Continued)

OTHER PUBLICATIONS

Received STIC search report from EIC 2800 searcher Benjamin Martin dated Oct. 6, 2017.*

(Continued)

*Primary Examiner* — Emily P Pham
*Assistant Examiner* — Htet Z Kyaw
(74) *Attorney, Agent, or Firm* — Oblon, McClelland, Maier & Neustadt, L.L.P.

(57) ABSTRACT

In this DC/DC converter, a first controller calculates a first operation value on the basis of a difference between output voltage Vout and a first calculated value calculated on the basis of a detection value of voltage of the charge/discharge capacitor. A second controller calculates a second operation value on the basis of a difference between a charge/discharge capacitor voltage target value Vcf* and charge/discharge capacitor voltage Vcf. In control blocks, addition and subtraction of the first and second operation values are performed, and the conduction rates for switching elements are controlled, to control the output voltage and a charge/discharge capacitor voltage, thereby preventing application of overvoltage to the switching elements.

13 Claims, 6 Drawing Sheets

(58) Field of Classification Search
USPC .................................................. 323/271, 299
See application file for complete search history.

(56) References Cited

U.S. PATENT DOCUMENTS

| | | | |
|---|---|---|---|
| 9,893,620 B2* | 2/2018 | Ikeda | .................... H02M 3/158 |
| 2012/0126764 A1 | 5/2012 | Urakabe et al. | |
| 2013/0119961 A1 | 5/2013 | Okuda et al. | |

FOREIGN PATENT DOCUMENTS

| | | |
|---|---|---|
| WO | 2011/016199 A1 | 2/2011 |
| WO | 2012/014912 A1 | 2/2012 |

OTHER PUBLICATIONS

International Search Report dated Mar. 15, 2016 in PCT/JP2015/085676, filed Dec. 21, 2015.

* cited by examiner

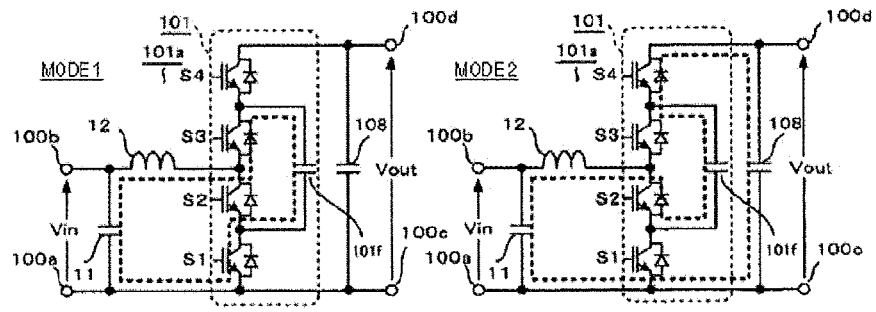
FIG.3A  FIG.3B
FIG.3C  FIG.3D
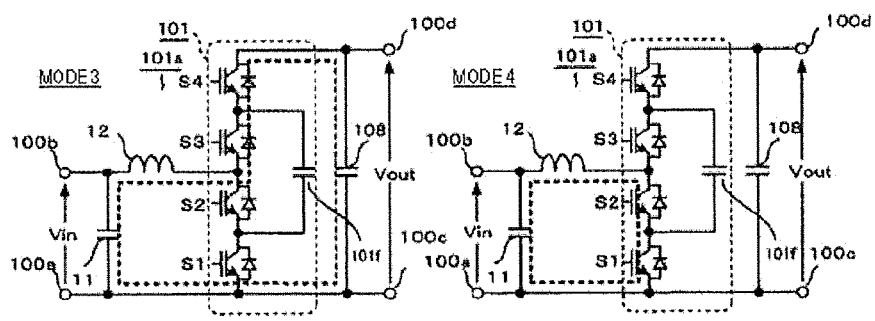
FIG. 4
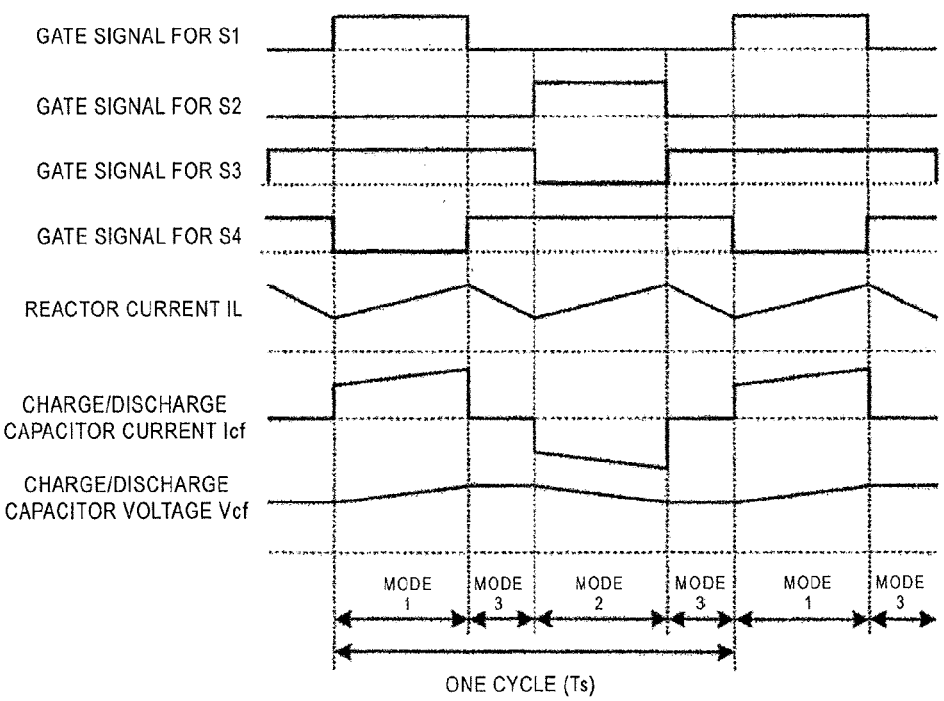

DC/DC CONVERTER

TECHNICAL FIELD

The present invention relates to a DC/DC converter.

BACKGROUND ART

In a conventional DC/DC converter shown in Patent Document 1, a high-voltage-side smoothing capacitor is connected in parallel to a series circuit having four switching elements (S1) to (S4) connected in series in this order via first to third connection portions, and a charge/discharge capacitor is connected between the first and third connection portions. Low-voltage-side voltage applied to the second connection portion via a reactor is stepped up through switching of the four switching elements (S1) to (S4) and then outputted from the series circuit. A first controller (25) calculates a first operation value on the basis of a difference between an output voltage target value Vout* and output voltage Vout, a second controller (26) calculates a second operation value on the basis of a difference between a charge/discharge capacitor voltage target value Vcf* and charge/discharge capacitor voltage Vcf, addition and subtraction of the first and second operation values are performed in control blocks (27), (28), and conduction rates for the switching elements (S1) to (S4) are controlled by gate signals G1, G2, to control output voltage and charge/discharge capacitor voltage, thereby preventing overvoltage breakdown of the switching elements (S1) to (S4).

CITATION LIST

Patent Document

Patent Document 1: Japanese Patent No. 5457559

SUMMARY OF THE INVENTION

Problems to be Solved by the Invention

In the conventional DC/DC converter, if the output voltage target value Vout* sharply changes, due to difference in calculation speed between the first controller 25 and the second controller 26, a time period for charge/discharge capacitor voltage Vcf to follow the target charge/discharge capacitor voltage Vcf* is delayed as compared to a time period for output voltage Vout to follow the output voltage target value Vout*, so that comparatively high voltage might be applied to the switching elements.

Therefore, in designing of the conventional DC/DC converter, it is necessary to select the switching elements in consideration of such a case where comparatively high voltage is applied to the switching elements, resulting in cost increase.

The present invention has been made to solve the above problem, and is configured such that, when the output voltage target value Vout* sharply changes, a time period for charge/discharge capacitor voltage Vcf to follow the target charge/discharge capacitor voltage Vcf* is not delayed as compared to a time period for output voltage Vout to follow the output voltage target value Vout*.

Solution to the Problems

A DC/DC converter of the present invention includes: a low-voltage-side smoothing capacitor holding low-voltage-side voltage; a high-voltage-side smoothing capacitor holding high-voltage-side voltage and having a negative-side terminal connected to a negative-side terminal of the low-voltage-side smoothing capacitor; a first semiconductor circuit having an end connected to the negative-side terminal of the low-voltage-side smoothing capacitor; a second semiconductor circuit having an end connected to another end of the first semiconductor circuit, and another end connected to a positive-side terminal of the low-voltage-side smoothing capacitor via a reactor; a third semiconductor circuit having an end connected to the other end of the second semiconductor circuit; a fourth semiconductor circuit having an end connected to another end of the third semiconductor circuit, and another end connected to a positive-side terminal of the high-voltage-side smoothing capacitor; a charge/discharge capacitor having an end connected to an intermediate connection point of the first semiconductor circuit and the second semiconductor circuit, and another end connected to an intermediate connection point of the third semiconductor circuit and the fourth semiconductor circuit; and a control device for controlling the semiconductor circuits.

The DC/DC converter is capable of at least one of:
a step-up operation in which
  the first and second semiconductor circuits are both caused to have switching element functions,
  the third and fourth semiconductor circuits are both caused to have diode element functions, and
  by switching-element ON/OFF-switching functions provided to the first and second semiconductor circuits, voltage of the low-voltage-side smoothing capacitor that is inputted is converted to stepped-up voltage, and the stepped-up voltage is outputted to the high-voltage-side smoothing capacitor; and
a step-down operation in which
  the third and fourth semiconductor circuits are both caused to have switching element functions,
  the first and second semiconductor circuits are both caused to have diode element functions, and
  by switching-element ON/OFF-switching functions provided to the third and fourth semiconductor circuits, voltage of the high-voltage-side smoothing capacitor that is inputted is converted to stepped-down voltage, and the stepped-down voltage is outputted to the low-voltage-side smoothing capacitor.

The control device includes a first operation unit, a second operation unit, and a switching control unit.

The first operation unit calculates a first calculated value by multiplying a detection value of voltage of the charge/discharge capacitor by a predetermined first constant, and calculates a first operation value on the basis of difference voltage between the first calculated value and a detection value of the high-voltage-side voltage.

The second operation unit calculates a second operation value on the basis of difference voltage between a second calculated value calculated on the basis of a command value for the high-voltage-side voltage, and the detection value of voltage of the charge/discharge capacitor.

The switching control unit calculates a current conduction rate on the basis of the first operation value and the second operation value, and controls, on the basis of the current conduction rate, switching operations of the first and second semiconductor circuits caused to have the ON/OFF-switching functions or of the third and fourth semiconductor circuits caused to have the ON/OFF-switching functions, thereby controlling the high-voltage-side voltage or the low-voltage-side voltage, and voltage of the charge/discharge capacitor.

Effect of the Invention

The present invention is configured such that, when the output voltage target value Vout* sharply changes, a time period for charge/discharge capacitor voltage Vcf to follow the target charge/discharge capacitor voltage Vcf* is not delayed as compared to a time period for output voltage Vout to follow the output voltage target value Vout*. Therefore, it is possible to select switching elements having a lower withstand voltage than the conventional ones, thereby reducing the manufacturing cost of the DC/DC converter.

BRIEF DESCRIPTION OF THE DRAWINGS

FIG. 3A is a diagram illustrating operation mode 1 of the DC/DC converter in embodiment 1.

FIG. 3B is a diagram illustrating operation mode 2 of the DC/DC converter in embodiment 1.

FIG. 3C is a diagram illustrating operation mode 3 of the DC/DC converter in embodiment 1.

FIG. 3D is a diagram illustrating operation mode 4 of the DC/DC converter in embodiment 1.

FIG. 4 is a diagram illustrating operation of the DC/DC converter in embodiment 1.

DESCRIPTION OF EMBODIMENTS

Embodiment 1

Figure 1:
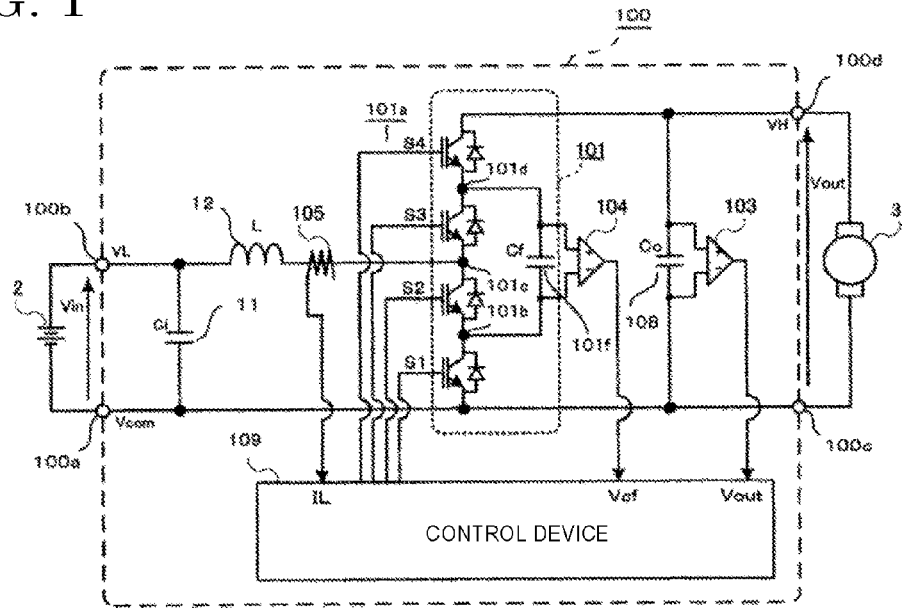
FIG. 1 is a configuration diagram showing the configuration of a DC/DC converter according to embodiment 1 of the present invention.
Figure 2:
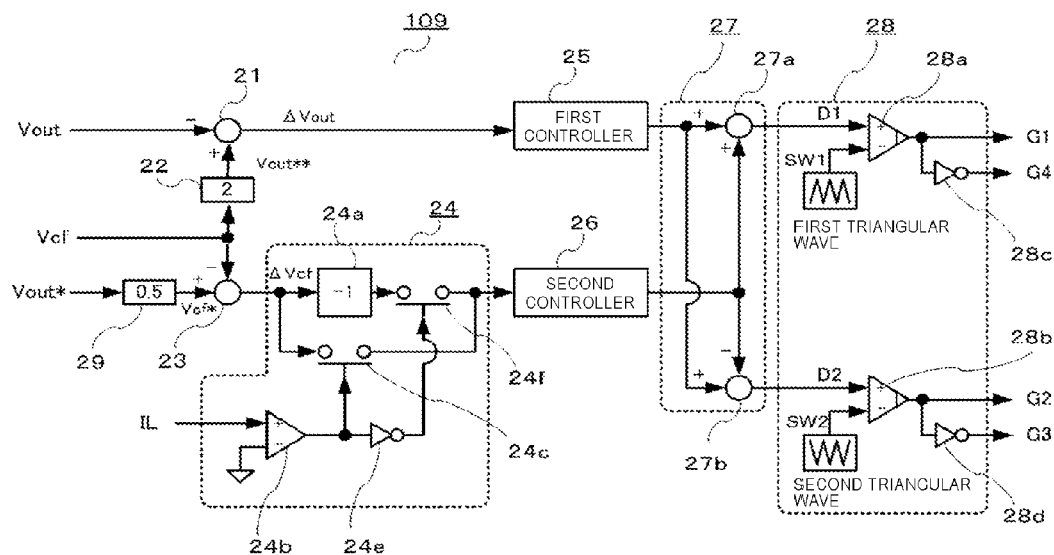
FIG. 2 is a circuit diagram showing the configuration of a control device in embodiment 1.
Figure 6:
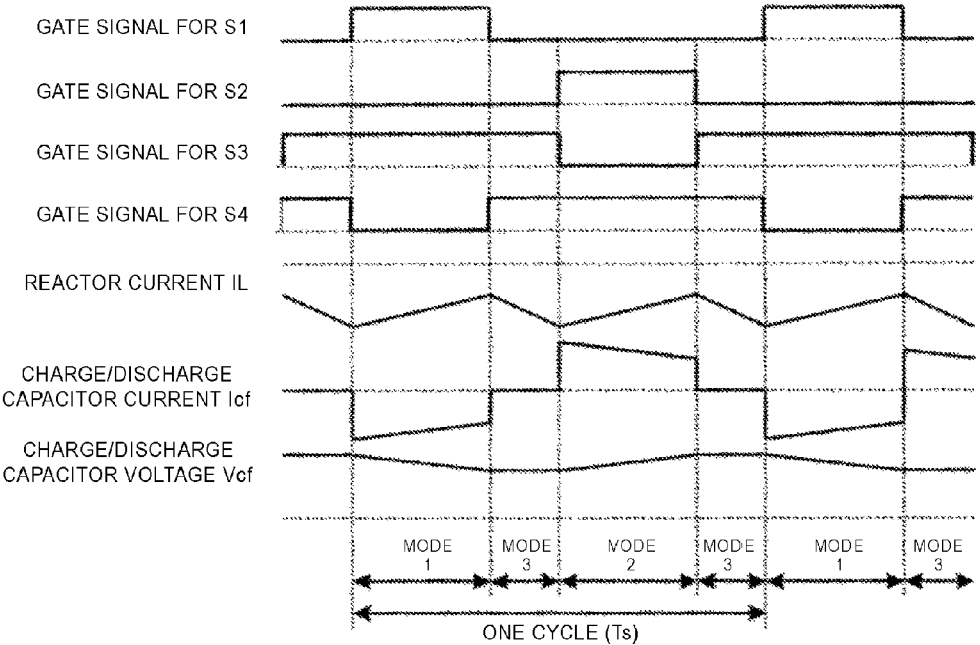
FIG. 6 is a diagram illustrating operation of the DC/DC converter in embodiment 1.
Figure 7:
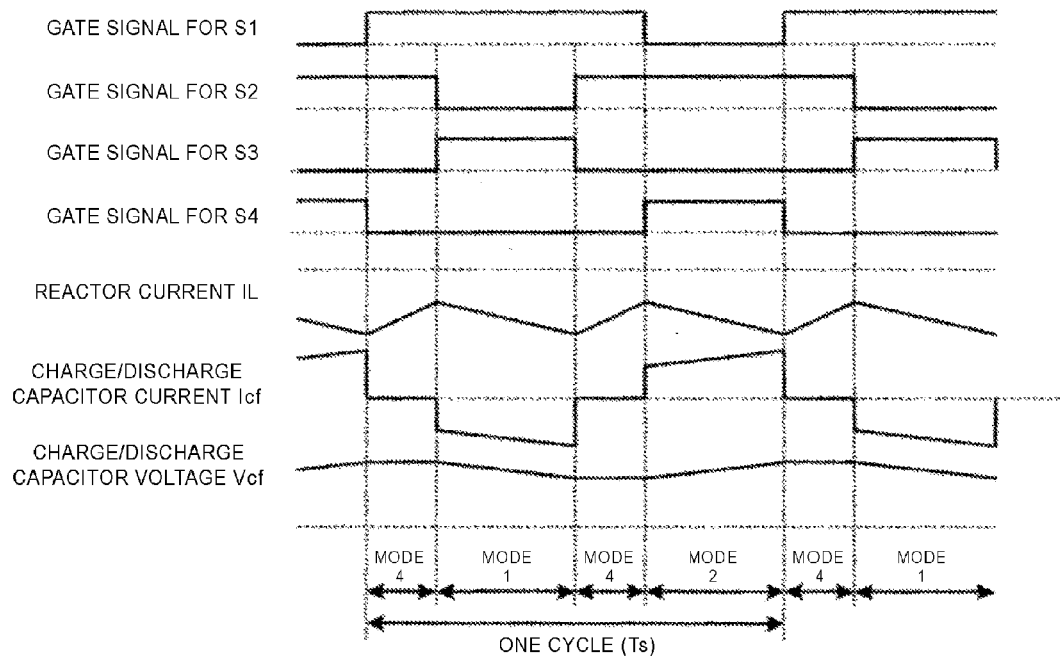
FIG. 7 is a diagram illustrating operation of the DC/DC converter in embodiment 1.
Figure 8:
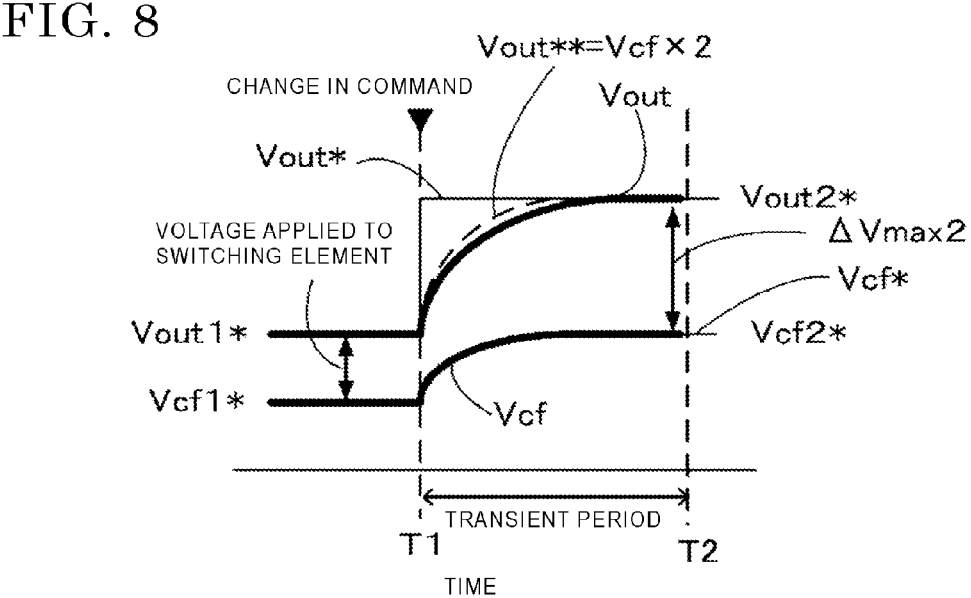
FIG. 8 is a diagram illustrating temporal changes in output voltage Vout and charge/discharge capacitor voltage Vcf in embodiment 1.
Figure 9:
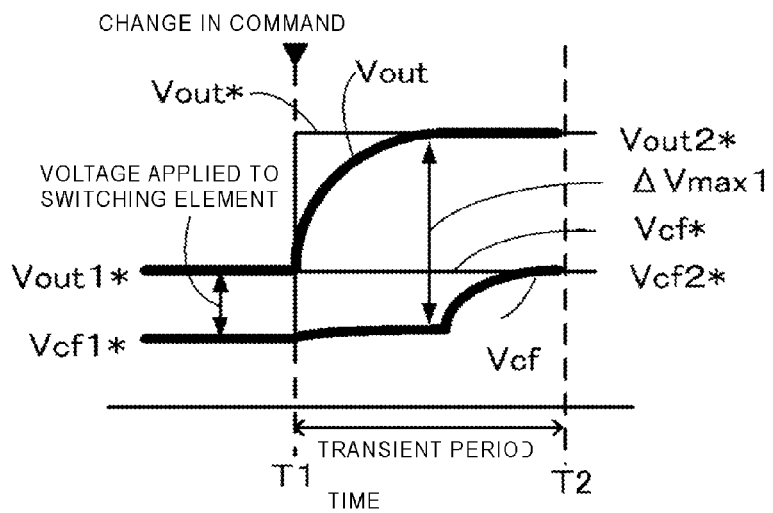
FIG. 9 is a diagram illustrating temporal changes in output voltage Vout and charge/discharge capacitor voltage Vcf in a conventional DC/DC converter.

FIG. 1 to FIG. 8 show embodiment 1 for carrying out the present invention. FIG. 1 is a configuration diagram showing the configuration of a DC/DC converter, FIG. 2 is a circuit diagram showing the configuration of a control device in FIG. 1, and FIGS. 3A-3D are diagrams illustrating operation modes of the DC/DC converter in FIG. 1. FIG. 4 to FIG. 7 are diagrams illustrating operation of the DC/DC converter in FIG. 1. FIG. 8 is a diagram illustrating temporal changes in output voltage Vout and charge/discharge capacitor voltage Vcf. FIG. 9 is a diagram illustrating temporal changes in output voltage Vout and charge/discharge capacitor voltage Vcf in a conventional DC/DC converter (Patent Document 1).

In FIG. 1, the DC/DC converter 100 is a bidirectional type capable of bidirectional power conversion between the low-voltage side and the high-voltage side, and includes a first terminal 100a, a second terminal 100b, a third terminal 100c, and a fourth terminal 100d as a terminal group and as first, second, third, and fourth terminals, respectively. The DC/DC converter 100 steps up DC input voltage Vin inputted between the first terminal 100a (Vcom) and the second terminal 100b (VL) which are low-voltage-side terminals, to voltage equal to or greater than the input voltage Vin, and outputs the stepped-up output voltage Vout between the third terminal 100c (Vcom) and the fourth terminal 100d (VH) which are high-voltage-side terminals. A battery 2 is connected between the first terminal 100a and the second terminal 100b, and an electric motor 3 is connected between the third terminal 100c and the fourth terminal 100d.

The DC/DC converter 100 includes: a low-voltage-side smoothing capacitor 11 (Ci) and a high-voltage-side smoothing capacitor 108 (Co) as a capacitor device; a reactor 12 (L); a DC voltage conversion unit 101; a voltage sensor 103; a voltage sensor 104; a current sensor 105; and a control device 109.

The low-voltage-side smoothing capacitor 11 has a terminal connected to the first terminal 100a, and another terminal connected to the second terminal 100b, and smooths input voltage Vin. The first terminal 100a and the third terminal 100c are connected in common. The first terminal 100a and the third terminal 100c may be configured by one terminal. The reactor 12 (L) is for accumulating energy, and is connected to the second terminal 100b and a second connection portion 101c (described later) which is a connection portion between the switching element S2 and the switching element S3. The DC voltage conversion unit 101 includes a charge/discharge capacitor 101f (Cf) and a switching element series circuit 101a as a semiconductor series circuit, and steps up input voltage Vin to output voltage Vout. The switching element series circuit 101a is composed of four switching elements S1, S2, S3, S4 as first to fourth semiconductor circuits, which are connected in series in this order via a first connection portion 101b, a second connection portion 101c, and a third connection portion 101d. Each switching element S1 to S4 is formed from, for example, a combination of an IGBT (Insulated Gate Bipolar Transistor) and an antiparallel diode, and in the present embodiment, is turned on when a corresponding gate signal is High. The charge/discharge capacitor 101f is connected to the first connection portion 101b and the third connection portion 101d.

A side of the switching element S1 opposite to the first connection portion 101b is connected to the first terminal 100a, and the second connection portion 101c is connected to the second terminal 100b via the reactor 12. Both ends of the switching element series circuit 101a are connected to the third terminal 100c and the fourth terminal 100d, the first terminal 100a and the third terminal 100c are connected in common, the first terminal 100a and the second terminal 100b are set as a low-voltage side, and the third terminal 100c and the fourth terminal 100d are set as a high-voltage side. In more detail, the emitter terminal of the switching element S1 is connected to the first terminal 100a, and the collector terminal of the switching element S4 is connected to the fourth terminal 100d. The second connection portion 101c which is a connection portion between the collector terminal of the switching element S2 and the emitter terminal of the switching element S3, is connected to the second terminal 100b via the reactor 12. The charge/discharge capacitor 101f has: a terminal connected to the first connection portion 101b which is a connection portion between the collector terminal of the switching element S1 and the emitter terminal of the switching element S2; and another terminal connected to the third connection portion 101d which is a connection portion between the collector terminal of the switching element S3 and the emitter terminal of the switching element S4.

The voltage sensor 103 detects, as high-voltage-side output voltage, inter-terminal voltage of the high-voltage-side smoothing capacitor 108 on the output side which is a capacitor device and a high-voltage-side capacitor. The voltage sensor 104 detects voltage (hereinafter, referred to as charge/discharge capacitor voltage) Vcf of the charge/discharge capacitor 101f included in the DC voltage conversion unit 101. The current sensor 105 detects reactor current IL flowing through the reactor 12. The high-voltage-side smoothing capacitor 108 on the output side smooths output voltage Vout stepped up by the DC voltage conversion unit 101. The control device 109 generates gate signals (G1 to G4) for the four switching elements S1 to S4 in accordance with detection values from the voltage sensors 103, 104, and the current sensor 105, to perform ON/OFF operations of the switching elements S1 to S4 of the DC voltage conversion unit 101.

FIG. 2 is a circuit diagram showing the detailed configuration of the control device 109. In FIG. 2, the control device 109 includes a subtractor 21, a multiplier 22, a subtractor 23, a first control block 24, a first controller 25, a second controller 26, a second control block 27, a third control block 28, and a multiplier 29. The first control block 24 includes a multiplier 24a, a comparator 24b, an open/close contact 24c, an inverter 24e, and an open/close contact 24f. The second control block 27 includes an adder 27a and a subtractor 27b. The third control block 28 includes a comparator 28a, a comparator 28b, an inverter 28c, and an inverter 28d. The subtractor 21, the multiplier 22, and the first controller 25 correspond to a first operation unit in the present invention. The multiplier 29, the subtractor 23, the first control block 24, and the second controller 26 correspond to a second operation unit in the present invention. The second control block 27 and the third control block 28 correspond to a switching control unit in the present invention. The comparator 24b corresponds to a reactor current direction detection unit in the present invention.

A voltage detection value of the charge/discharge capacitor detected by the voltage sensor 104 is inputted as charge/discharge capacitor voltage Vcf to the multiplier 22. The charge/discharge capacitor voltage Vcf is multiplied by 2 by a multiplier 22 with a multiplication constant set at 2, to calculate an output voltage provisional target value Vout. The output voltage provisional target value Vout and output voltage Vout which is a detection value of high-voltage-side voltage detected by the voltage sensor 103 are inputted to the subtractor 21, and then the difference therebetween, i.e., difference voltage ΔVout, is inputted to the first controller 25.

An output voltage target value Vout* as a command value for the high-voltage-side voltage is multiplied by 0.5 by the multiplier 29 with a multiplication constant set at 0.5, to calculate a charge/discharge capacitor voltage target value Vcf* as a voltage command value for the charge/discharge capacitor.

The charge/discharge capacitor voltage target value Vcf* and charge/discharge capacitor voltage Vcf are inputted to the subtractor 23, to calculate the difference therebetween, i.e., difference voltage ΔVcf, which is inputted to the first control block 24.

As described in detail later, the second controller 26 amplifies the difference voltage ΔVcf between the charge/discharge capacitor voltage target value Vcf* and the charge/discharge capacitor voltage Vcf. In the present embodiment, in order to minimize ripple current of the reactor, the charge/discharge capacitor voltage target value Vcf* is set at ½ (0.5 times) of the output voltage target value Vout*, as described above.

In the first control block 24, reactor current IL detected by the current sensor 105 is inputted to the comparator 24b, and the open/close contacts 24c, 24f are opened or closed in accordance with the polarity of the reactor current IL, thereby switching the polarity of difference voltage ΔVcf between the charge/discharge capacitor voltage target value Vcf* and the charge/discharge capacitor voltage Vcf. When reactor current IL is positive, the difference voltage ΔVcf is outputted as it is, and when reactor current IL is negative, the difference voltage ΔVcf is multiplied by −1 by the multiplier 24a to invert the polarity thereof, and then outputted to the second controller 26 by the open/close contact 24f being closed via the inverter 24e. Output of the first controller 25 as a first operation value and output of the second controller 26 as a second operation value are inputted to the second control block 27. These values are added by the adder 27a and the resultant value is outputted to the third control block 28, as an ON duty D1 which is a current conduction rate for the switching element S1. In addition, a difference between output of the first controller 25 and output of the second controller 26 is calculated by the subtractor 27b, and is outputted to the third control block 28, as an ON duty D2 which is a current conduction rate for the switching element S2.

The third control block 28 is a block for generating PWM (Pulse Width Modulation) signals. A gate signal G1 for the switching element S1 is generated through comparison between the ON duty D1 and a first triangular wave SW1 inputted to the comparator 28a. A gate signal G2 for the switching element S2 is generated through comparison between the ON duty D2 and a second triangular wave SW2 inputted to the comparator 28b. A signal obtained by the inverter 28d inverting the gate signal G2 is outputted as a gate signal G3 for the switching element S3. A signal obtained by the inverter 28c inverting the gate signal G1 is outputted as a gate signal G4 for the switching element S4. Here, in order to minimize ripple current of the reactor 12, the first triangular wave SW1 and the second triangular wave SW2 are set to be signals having phases inverted from each other by 180 degrees.

Next, operation of the DC/DC converter 100 in a steady state will be described. The steady state refers to a state in which output voltage is stably obtained through ON/OFF control of the switching elements S1 to S4. Operation states of the DC/DC converter 100 include two states of a state in which power is supplied from the battery 2 to the electric motor 3 and thereby the electric motor 3 is driven (power-running operation), and a state in which power generated by the electric motor 3 in an electric generation state is supplied to the battery 2 (regeneration operation).

As shown in FIGS. 3A-3D, operation modes of the DC/DC converter in a steady state include four modes 1 to 4. As shown in FIG. 3A, in the mode 1, S1 and S3 are turned on, and S2 and S4 are turned off. In power-running operation, energy is accumulated in the charge/discharge capacitor 101f, and in regeneration operation, energy of the charge/discharge capacitor 101f is released. As shown in FIG. 3B, in the mode 2, S1 and S3 are turned off, and S2 and S4 are turned on. In power-running operation, energy of the charge/ discharge capacitor 101f is released, and in regeneration operation, energy is accumulated in the charge/discharge capacitor 101f As shown in FIG. 3C, in the mode 3, S1 and S2 are turned off, and S3 and S4 are turned on. In power-running operation, energy of the reactor 12 is released, and in regeneration operation, energy is accumulated in the reactor 12. As shown in FIG. 3D, in the mode 4, S1 and S2 are turned on, and S3 and S4 are turned off. In power-running operation, energy is accumulated in the reactor 12, and in regeneration operation, energy of the reactor 12 is released. By adjusting the time ratio of these operation modes as appropriate, input voltage yin which is the low-voltage-side voltage inputted between the first terminal 100a and the second terminal 100b can be stepped up to arbitrary voltage, and the stepped-up voltage can be outputted as output voltage Vout between the third terminal 100c and the fourth terminal 100d.

Operation in a steady state of the DC/DC converter 100 is different between the case where a step-up ratio N of output voltage Vout to input voltage Vin is smaller than two, and the case where the step-up ratio N is equal to or greater than two.

First, operation in a power-running state in the case where the step-up ratio N is smaller than two will be described.

FIG. 4 shows the voltage waveforms of gate signals for the switching elements S1 to S4, the waveform of reactor current IL, the waveform of current Icf of the charge/discharge capacitor 101f, and the waveform of charge/discharge capacitor voltage Vcf, in the case where the step-up ratio N is smaller than two. In a steady state, charge/discharge capacitor voltage Vcf is controlled to be about ½ of output voltage Vout, and the magnitude relationship among input voltage Vin, output voltage Vout, and charge/discharge capacitor voltage Vcf is as follows.

$$Vout > Vin > Vcf$$

In a state in which the gate signals for the switching element S1 and the switching element S3 are High and the gate signals for the switching element S2 and the switching element S4 are Low (mode 1 (FIG. 3A)), the switching element S1 and the switching element S3 are turned on, and the switching element S2 and the switching element S4 are turned off. Therefore, energy is transferred from the low-voltage-side smoothing capacitor 11 to the reactor 12 and the charge/discharge capacitor 101f through the following route.

Low-voltage-side smoothing capacitor 11 (Ci)→reactor 12 (L)→switching element S3→charge/discharge capacitor 101f (Cf)→switching element S1

Next, in a state in which the gate signals for the switching element S1 and the switching element S2 are Low and the gate signals for the switching element S3 and the switching element S4 are High (mode 3 (FIG. 3C)), the switching element S1 and the switching element S2 are turned off, and the switching element S3 and the switching element S4 are turned on. Therefore, energy accumulated in the reactor 12 is transferred to the low-voltage-side smoothing capacitor 11 and the high-voltage-side smoothing capacitor 108 through the following route.

Low-voltage-side smoothing capacitor 11 (Ci)→reactor 12 (L)→switching element S3→switching element S4→high-voltage-side smoothing capacitor 108 (Co)

Next, in a state in which the gate signals for the switching element S1 and the switching element S3 are Low and the gate signals for the switching element S2 and the switching element S4 are High (mode 2 (FIG. 3B)), the switching element S1 and the switching element S3 are turned off, and the switching element S2 and the switching element S4 are turned on. Therefore, energy accumulated in the charge/discharge capacitor 101f is transferred to the low-voltage-side smoothing capacitor 11 and the high-voltage-side smoothing capacitor 108, and energy is accumulated in the reactor 12, through the following route.

Low-voltage-side smoothing capacitor 11 (Ci)→reactor 12 (L)→switching element S2→charge/discharge capacitor 101f(Cf)→switching element S4→high-voltage-side smoothing capacitor 108 (Co)

Next, in a state in which the gate signals for the switching element S1 and the switching element S2 are Low and the gate signals for the switching element S3 and the switching element S4 are High (mode 3), the switching element S1 and the switching element S2 are turned off, and the switching element S3 and the switching element S4 are turned on. Therefore, energy accumulated in the reactor 12 is transferred to the low-voltage-side smoothing capacitor 11 and the high-voltage-side smoothing capacitor 108 through the following route.

Low-voltage-side smoothing capacitor 11 (Ci)→reactor 12 (L)→switching element S3→switching element S4→high-voltage-side smoothing capacitor 108 (Co)

Through repetition of this series of operations "mode 1-mode 3-mode 2-mode 3", input voltage Vin inputted between the first terminal 100a and the second terminal 100b is stepped up to arbitrary voltage from once to less than twice the original voltage, and the stepped-up voltage is outputted as output voltage Vout between the third terminal 100c and the fourth terminal 100d, while energy of the battery 2 is supplied to the electric motor 3.

Next, operation in a power-running state in the case where the step-up ratio N is equal to or greater than two will be described.

Figure 5:
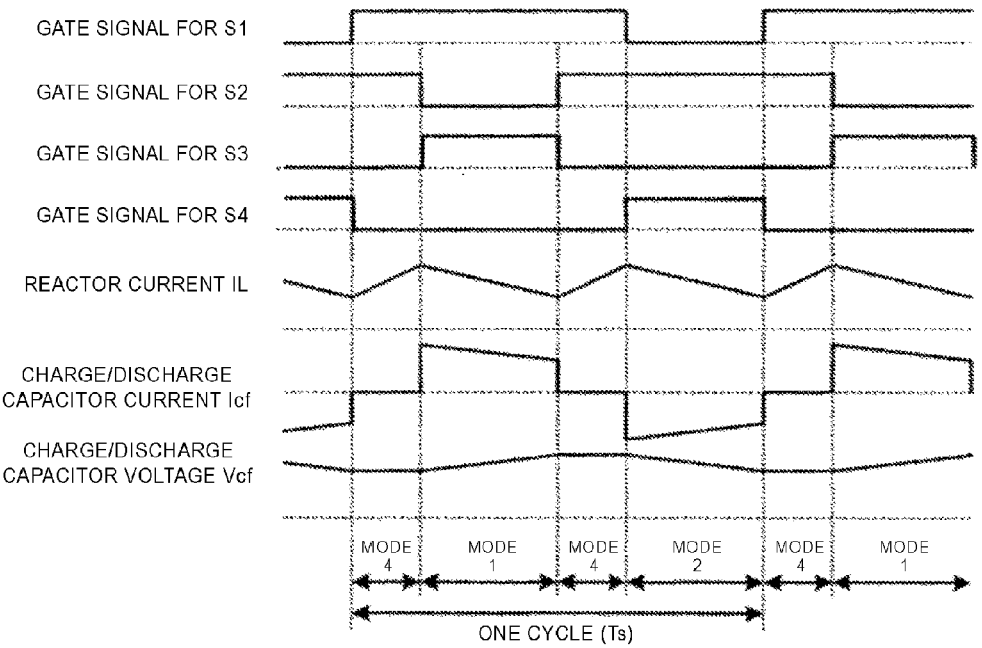
FIG. 5 is a diagram illustrating operation of the DC/DC converter in embodiment 1.

FIG. 5 shows the voltage waveforms of gate signals for the switching elements S1 to S4, the waveform of reactor current IL, the waveform of current (charge/discharge capacitor current) Icf of the charge/discharge capacitor 101f, and the waveform of charge/discharge capacitor voltage Vcf, in the case where the step-up ratio N is equal to or greater than two. In a steady state, charge/discharge capacitor voltage Vcf is controlled to be about ½ of output voltage Vout, and the magnitude relationship among input voltage Vin, output voltage Vout, and charge/discharge capacitor voltage Vcf is as follows.

$$Vout > Vcf > Vin$$

In a state in which the gate signals for the switching element S1 and the switching element S2 are High and the gate signals for the switching element S3 and the switching element S4 are Low (mode 4 (FIG. 3D)), the switching element S1 and the switching element S2 are turned on, and the switching element S3 and the switching element S4 are turned off. Therefore, energy is transferred from the low-voltage-side smoothing capacitor 11 to the reactor 12 through the following route.

Low-voltage-side smoothing capacitor 11 (Ci)→reactor 12 (L)→switching element S2→switching element S1

Next, in a state in which the gate signals for the switching element S1 and the switching element S3 are High and the gate signals for the switching element S2 and the switching element S4 are Low (mode 1), the switching element S1 and the switching element S3 are turned on, and the switching element S2 and the switching element S4 are turned off. Therefore, energy accumulated in the reactor 12 is transferred to the low-voltage-side smoothing capacitor 11 and the charge/discharge capacitor 101f through the following route.

Low-voltage-side smoothing capacitor 11 (Ci)→reactor 12 (L)→switching element S3→charge/discharge capacitor 101f (Cf)→switching element S1

Next, in a state in which the gate signals for the switching element S1 and the switching element S2 are High and the gate signals for the switching element S3 and the switching element S4 are Low (mode 4), the switching element S1 and the switching element S2 are turned on, and the switching element S3 and the switching element S4 are turned off. Therefore, energy is transferred from the low-voltage-side smoothing capacitor 11 to the reactor 12 through the following route.

Low-voltage-side smoothing capacitor 11 (Ci)→reactor 12 (L)→switching element S2→switching element S1

Next, in a state in which the gate signals for the switching element S1 and the switching element S3 are Low and the gate signals for the switching element S2 and the switching element S4 are High (mode 2), the switching element S1 and the switching element S3 are turned off, and the switching element S2 and the switching element S4 are turned on. Therefore, energy accumulated in the reactor 12 and the charge/discharge capacitor 101f is transferred to the low-voltage-side smoothing capacitor 11 and the high-voltage-side smoothing capacitor 108 through the following route.

Low-voltage-side smoothing capacitor 11 (Ci)→reactor 12 (L)→switching element S2→charge/discharge capacitor 101f (Cf)→switching element S4→high-voltage-side smoothing capacitor 108 (Co)

Through repetition of this series of operations "mode 4-mode 1-mode 4-mode 2", input voltage Vin inputted between the first terminal 100a and the second terminal 100b is stepped up to arbitrary voltage equal to or greater than twice the original voltage, and the stepped-up voltage is outputted as output voltage Vout between the third terminal 100c and the fourth terminal 100d, while energy of the battery 2 is supplied to the electric motor 3.

Next, operation in a regeneration state in the case where the step-up ratio N is smaller than two will be described.

FIG. 6 shows the voltage waveforms of gate signals for the switching elements S1 to S4, the waveform of reactor current IL, the waveform of charge/discharge capacitor current Icf, and the waveform of charge/discharge capacitor voltage Vcf, in the case where the step-up ratio N is smaller than two. In a steady state, charge/discharge capacitor voltage Vcf is controlled to be about ½ of output voltage Vout, and the magnitude relationship among input voltage Vin, output voltage Vout, and charge/discharge capacitor voltage Vcf is as follows.

$$Vout > Vin > Vcf$$

In a state in which the gate signals for the switching element S1 and the switching element S3 are High and the gate signals for the switching element S2 and the switching element S4 are Low (mode 1), the switching element S1 and the switching element S3 are turned on, and the switching element S2 and the switching element S4 are turned off. Therefore, energy is transferred from the charge/discharge capacitor 101f and the reactor 12 to the low-voltage-side smoothing capacitor 11 through the following route.

Low-voltage-side smoothing capacitor 11 (Ci)←reactor 12 (L)←switching element S3←charge/discharge capacitor 101f (Cf)←switching element S1

Next, in a state in which the gate signals for the switching element S1 and the switching element S2 are Low and the gate signals for the switching element S3 and the switching element S4 are High (mode 3), the switching element S1 and the switching element S2 are turned off, and the switching element S3 and the switching element S4 are turned on. Therefore, energy is transferred from the high-voltage-side smoothing capacitor 108 to the reactor 12 and the low-voltage-side smoothing capacitor 11 through the following route.

Low-voltage-side smoothing capacitor 11 (Ci)←reactor 12 (L)←switching element S3←switching element S4←high-voltage-side smoothing capacitor 108 (Co)

Next, in a state in which the gate signals for the switching element S1 and the switching element S3 are Low and the gate signals for the switching element S2 and the switching element S4 are High (mode 2), the switching element S1 and the switching element S3 are turned off, and the switching element S2 and the switching element S4 are turned on. Therefore, energy is transferred from the high-voltage-side smoothing capacitor 108 and the reactor 12 to the charge/discharge capacitor 101f and the low-voltage-side smoothing capacitor 11 through the following route.

Low-voltage-side smoothing capacitor 11 (Ci)←reactor 12 (L)←switching element S2←charge/discharge capacitor 101f (Cf)←switching element S4←high-voltage-side smoothing capacitor 108 (Co)

Next, in a state in which the gate signals for the switching element S1 and the switching element S2 are Low and the gate signals for the switching element S3 and the switching element S4 are High (mode 3), the switching element S1 and the switching element S2 are turned off, and the switching element S3 and the switching element S4 are turned on. Therefore, energy is transferred from the high-voltage-side smoothing capacitor 108 to the reactor 12 and the low-voltage-side smoothing capacitor 11 through the following route.

Low-voltage-side smoothing capacitor 11 (Ci)←reactor 12 (L)←switching element S3←switching element S4←high-voltage-side smoothing capacitor 108 (Co)

Through repetition of this series of operations "mode 1-mode 3-mode 2-mode 3", input voltage Vin inputted between the first terminal 100a and the second terminal 100b is stepped up to arbitrary voltage from once to less than twice the original voltage, and the stepped-up voltage is outputted as output voltage Vout between the third terminal 100c and the fourth terminal 100d, while electric generation energy of the electric motor 3 is accumulated in the battery 2.

Next, operation in a regeneration state in the case where the step-up ratio N is equal to or greater than two will be described.

FIG. 7 shows the voltage waveforms of gate signals for the switching element S1 and the switching element S2, the waveform of reactor current IL, the waveform of charge/discharge capacitor current Icf, and the waveform of charge/discharge capacitor voltage Vcf, in a regeneration state in the case where the step-up ratio N is equal to or greater than two. In a steady state, charge/discharge capacitor voltage Vcf is controlled to be about ½ of output voltage Vout, and the magnitude relationship among input voltage Vin, output voltage Vout, and charge/discharge capacitor voltage Vcf is as follows.

$$Vout > Vcf > Vin$$

In a state in which the gate signals for the switching element S1 and the switching element S2 are High and the gate signals for the switching element S3 and the switching element S4 are Low (mode 4), the switching element S1 and the switching element S2 are turned on, and the switching element S3 and the switching element S4 are turned off.

Therefore, energy is transferred from the reactor 12 to the low-voltage-side smoothing capacitor 11 through the following route.

Low-voltage-side smoothing capacitor 11 (Ci)←reactor 12 (L)←switching element S2←switching element S1

Next, in a state in which the gate signals for the switching element S1 and the switching element S3 are High and the gate signals for the switching element S2 and the switching element S4 are Low (mode 1), the switching element S1 and the switching element S3 are turned on, and the switching element S2 and the switching element S4 are turned off. Therefore, energy is transferred from the charge/discharge capacitor 101f to the reactor 12 and the low-voltage-side smoothing capacitor 11 through the following route.

Low-voltage-side smoothing capacitor 11 (Ci)←reactor 12 (L)←switching element S3←charge/discharge capacitor 101f (Cf)←switching element S1

Next, in a state in which the gate signals for the switching element S1 and the switching element S2 are High and the gate signals for the switching element S3 and the switching element S4 are Low (mode 4), the switching element S1 and the switching element S2 are turned on, and the switching element S3 and the switching element S4 are turned off. Therefore, energy is transferred from the reactor 12 to the low-voltage-side smoothing capacitor 11 through the following route.

Low-voltage-side smoothing capacitor 11 (Ci)←reactor 12 (L)←switching element S2←switching element S1

Next, in a state in which the gate signals for the switching element S1 and the switching element S3 are Low and the gate signals for the switching element S2 and the switching element S4 are High (mode 2), the switching element S1 and the switching element S3 are turned off, and the switching element S2 and the switching element S4 are turned on. Therefore, energy is transferred from the high-voltage-side smoothing capacitor 108 to the reactor 12, the charge/discharge capacitor 101f, and the low-voltage-side smoothing capacitor 11 through the following route.

Low-voltage-side smoothing capacitor 11 (Ci)←reactor 12 (L)←switching element S2←charge/discharge capacitor 101f (Cf)←switching element S4←high-voltage-side smoothing capacitor 108 (Co)

Through repetition of this series of operations "mode 4-mode 1-mode 4-mode 2", input voltage Vin inputted between the first terminal 100a and the second terminal 100b is stepped up to arbitrary voltage equal to or greater than twice the original voltage, and the stepped-up voltage is outputted as output voltage Vout between the third terminal 100c and the fourth terminal 100d, while electric generation energy of the electric motor 3 is accumulated in the battery 2.

Next, operation of the control device 109 of the DC/DC converter 100 in the present embodiment 1 will be described. If an ON duty for the switching element S1 is D1 and an ON duty for the switching element S2 is D2, an ON duty for the switching element S3 is (1−D2), and an ON duty for the switching element S4 is (1−D1). If the electrostatic capacitance of the low-voltage-side smoothing capacitor 11 is Ci, the electrostatic capacitance of the high-voltage-side smoothing capacitor 108 on the output side is Co, the electrostatic capacitance of the charge/discharge capacitor 101f is Cf, the inductance value of the reactor 12 for accumulating energy is L, current flowing through the reactor is IL, and the output current is Io, a state average equation of the DC/DC converter 100 can be represented by expression (1).

[Mathematical 1]

$$\frac{d}{dt}\begin{bmatrix} I_l \\ V_{out} \\ V_{cf} \end{bmatrix} = \begin{bmatrix} 0 & -\frac{1-D_1}{L} & \frac{D_2-D_1}{L} \\ \frac{1-D_1}{C_o} & 0 & 0 \\ \frac{D_1-D_2}{C_f} & 0 & 0 \end{bmatrix} \begin{bmatrix} I_l \\ V_{out} \\ V_{cf} \end{bmatrix} + \begin{bmatrix} \frac{1}{L} \\ 0 \\ 0 \end{bmatrix} V_{in} + \begin{bmatrix} 0 \\ -\frac{1}{C_o} \\ 0 \end{bmatrix} I_O \quad (1)$$

In a steady state, if the left-hand side of expression (1) is set at zero, expressions (2) to (4) are obtained, and it is found that, in a steady state, if the ON duty D1 is equal to the ON duty D2, ideally, output voltage Vout and charge/discharge capacitor voltage Vcf converge to constant values.

$$Vout/Vin=1/(1-D1) \quad (2)$$

$$IL=Io/(1-D1) \quad (3)$$

$$D1=D2 \quad (4)$$

However, in an actual DC/DC converter, there is a deviation from an ideal state, such as loss due to a resistive component in the circuit, and ON duty error due to variation in signal delay among the gate signals. In particular, an influence on charge/discharge capacitor voltage Vcf by a difference between the ON duty D1 for the switching element S1 and the ON duty D2 for the switching element S2 is great. In power-running operation, if the ON duty D1 is greater than the ON duty D2, according to expression (1), charge/discharge capacitor voltage Vcf gradually increases and eventually becomes the same value as output voltage Vout. On the other hand, if the ON duty D1 is smaller than the ON duty D2, according to expression (1), in power-running operation, charge/discharge capacitor voltage Vcf gradually decreases and eventually becomes 0 volts.

When charge/discharge capacitor voltage Vcf decreases to be 0 volts, if the switching element S1 is ON and the switching element S4 is OFF, output voltage Vout is applied to only the switching element S4, and if the switching element S1 is OFF and the switching element S4 is ON, output voltage Vout is applied to only the switching element S1. On the other hand, when charge/discharge capacitor voltage Vcf increases to be output voltage Vout, output voltage Vout is applied to either the switching element S2 or the switching element S3. In order to prevent overvoltage breakdown of the switching elements, it is necessary to set the element withstand voltage of the switching elements to be equal to or greater than output voltage Vout, leading to additional cost increase or efficiency reduction.

In the present embodiment, the first controller 25 is provided which, using, as the output voltage provisional target value Vout, a value obtained by multiplying the charge/discharge capacitor voltage Vcf by a constant of 2, performs feedback control on the basis of a difference between the output voltage provisional target value Vout and output voltage Vout; the second controller 26 is provided which, using, as the target charge/discharge capacitor voltage Vcf*, a value obtained by multiplying the output voltage target value Vout* by a constant of 0.5, performs feedback control on the basis of a difference between the target charge/discharge capacitor voltage Vcf* and charge/discharge capacitor voltage Vcf; and the output values of the first and second controllers 25, 26 are added and subtracted to calculate an addition value and a subtraction value thereof, which are used as ON duty commands for the switching elements S1 to S4. Therefore, it is possible to control output voltage Vout and charge/discharge capacitor voltage Vcf to desired values.

The output voltage provisional target value Vout** and the constant of 2 are respectively a first calculated value and a first constant which indicate the characteristics of the present invention. Similarly, the target charge/discharge capacitor voltage Vcf* and the constant of 0.5 are respectively a second calculated value and a second constant which indicate the characteristics of the present invention.

Hereinafter, the detailed operation of the control device 109 will be described. In the case where output voltage Vout is greater than the output voltage target value Vout*, for the purpose of decreasing output voltage Vout, first, in order to decrease charge/discharge capacitor voltage Vcf, the second controller 26 outputs the second operation value so that, in power-running operation, the ON duty D1 becomes smaller than the ON duty D2, and in regeneration operation, the ON duty D1 becomes greater than the ON duty D2. As the charge/discharge capacitor Vcf decreases, the output provisional target value Vout decreases, and the first controller 25** outputs the first operation value so as to decrease both ON duties for the switching element S1 and the switching element S2. On the other hand, in the case where output voltage Vout is smaller than the output voltage target value Vout*, for the purpose of increasing output voltage Vout, first, in order to increase charge/discharge capacitor voltage Vcf, the second controller 26 outputs the second operation value so that, in power-running operation, the ON duty D1 becomes greater than the ON duty D2, and in regeneration operation, the ON duty D1 becomes smaller than the ON duty D2. As the charge/discharge capacitor Vcf increases, the output provisional target value Vout increases, and the first controller 25** outputs the first operation value so as to increase both ON duties for the switching element S1 and the switching element S2.

In the case of controlling charge/discharge capacitor voltage Vcf to be target charge/discharge capacitor voltage Vcf*, as shown by expression (1), the convergence condition differs between power-running operation (reactor current IL is positive) and regeneration operation (reactor current IL is negative).

In the case where reactor current IL is positive (power-running operation) and charge/discharge capacitor voltage Vcf is greater than target charge/discharge capacitor voltage Vcf*, in order to decrease charge/discharge capacitor voltage Vcf, the second controller 26 outputs the second operation value so as to decrease the ON duty D1 for the switching element S1 and increase the ON duty D2 for the switching element S2. In the case where reactor current IL is positive (power-running operation) and charge/discharge capacitor voltage Vcf is smaller than target charge/discharge capacitor voltage Vcf*, in order to increase charge/discharge capacitor voltage Vcf, the second controller 26 outputs the second operation value so as to increase the ON duty D1 for the switching element S1 and decrease the ON duty D2 for the switching element S2.

In the case where reactor current IL is negative (regeneration operation) and charge/discharge capacitor voltage Vcf is greater than target charge/discharge capacitor voltage Vcf*, in order to decrease charge/discharge capacitor voltage Vcf, the second controller 26 outputs the second operation value so as to increase the ON duty D1 for the switching element S1 and decrease the ON duty D2 for the switching element S2. In the case where reactor current IL is negative (regeneration operation) and charge/discharge capacitor voltage Vcf is smaller than target charge/discharge capacitor voltage Vcf*, in order to increase charge/discharge capacitor voltage Vcf, the second controller 26 outputs the second operation value so as to decrease the ON duty D1 for the switching element S1 and increase the ON duty D2 for the switching element S2.

By performing control as described above, it becomes possible to control output voltage Vout to be the output voltage target value Vout*, and control charge/discharge capacitor voltage Vcf to be the target charge/discharge capacitor voltage Vcf*, irrespective of whether power-running operation or regeneration operation is performed. In addition, the current sensor 105 only needs to have a function of determining the polarity of current flowing through the reactor 12, and therefore an inexpensive sensor can be used as the current sensor 105, whereby the control device of the DC/DC converter can be configured at low cost.

In the conventional DC/DC converter (Patent Document 1), the following control is performed in order to prevent overvoltage breakdown of switching elements.

That is, the conventional DC/DC converter includes: a first controller 25 which, in order to cause output voltage Vout to be the output voltage target value Vout*, performs feedback control on the basis of a difference between the output voltage target value Vout* and output voltage Vout; and a second controller 26 which, in order to cause charge/discharge capacitor voltage Vcf to be target voltage (target charge/discharge capacitor voltage) Vcf* for the charge/discharge capacitor 101f, sets the target charge/discharge capacitor voltage Vcf* to be ½ of output voltage Vout, and performs feedback control on the basis of a difference between target charge/discharge capacitor voltage Vcf* and charge/discharge capacitor voltage Vcf, wherein output voltage Vout and charge/discharge capacitor voltage Vcf are controlled to be desired values.

However, when the output voltage target value Vout* sharply changes, due to difference in calculation speed between the first controller 25 and the second controller 26, a time period for charge/discharge capacitor voltage Vcf to follow target charge/discharge capacitor voltage Vcf* becomes longer than a time period for output voltage Vout to follow the output voltage target value Vout*. Even in the case where the calculation speeds of the first controller 25 and the second controller 26 are the same, if the first operation value outputted from the first controller 25 is 1 or not less than a value obtained by subtracting the absolute value of the second operation value from 1, one of the ON duties D1 and D2 calculated by the adder 27a and the subtractor 27b of the second control block 27 exceeds 1, and therefore the calculation result is not reflected in the conduction times of the switching elements S1 and S2. Similarly, if the first operation value outputted from the first controller 25 is 0 or not greater than a value obtained by adding the absolute value of the second operation value to 0, one of the ON duties D1 and D2 calculated by the adder 27a and the subtractor 27b of the second control block 27 becomes smaller than 0, and therefore the calculation result is not reflected in the conduction times of S1 and S2. Thus, in a steady state, even in the case where the calculation speeds of the first controller 25 and the second controller 26 are the same, a time period for charge/discharge capacitor voltage Vcf to follow target charge/discharge capacitor voltage Vcf* becomes longer than a time period for output voltage Vout to follow the output voltage target value Vout*.

Therefore, when the switching element S1 is ON and the switching element S4 is OFF, comparatively high voltage (maximum difference voltage ΔVmax1 described later) can be applied to the switching element S4 during the time period for charge/discharge capacitor voltage Vcf to follow target charge/discharge capacitor voltage Vcf*. Similarly, also when the switching element S1 is OFF and the switching element S4 is ON, comparatively high voltage (maximum difference voltage ΔVmax1) can be applied to the switching element S1 during the time period for charge/discharge capacitor voltage Vcf to follow the target charge/discharge capacitor voltage Vcf*. Therefore, the element withstand voltage of the switching elements needs to be equal to or greater than such comparatively high voltage (maximum difference voltage ΔVmax1).

Next, the detailed operation when the output voltage target value Vout* sharply changes in each of the case of the present embodiment and the case of the conventional DC/DC converter (Patent Document 1) will be described. FIG. 8 shows temporal changes in output voltage Vout and charge/discharge capacitor voltage Vcf when the output voltage target value Vout* sharply changes, in the present embodiment. On the other hand, FIG. 9 shows temporal changes in output voltage Vout and charge/discharge capacitor voltage Vcf when the output voltage target value Vout* sharply changes, in the conventional DC/DC converter.

With reference to FIG. 9, temporal changes in output voltage Vout and charge/discharge capacitor voltage Vcf in the conventional DC/DC converter will be described. In FIG. 9, the horizontal axis indicates temporal change, and the vertical axis indicates the voltage value. In FIG. 9, one of thick lines indicates change in charge/discharge capacitor voltage Vcf, and the other thick line indicates change in output voltage Vout. In addition, one of thin lines indicates change in target charge/discharge capacitor voltage Vcf*, and the other thin line indicates change in the output voltage target value Vout*. When the switching element S1 is ON and the switching element S4 is OFF, voltage applied to the switching element S4 is a difference between output voltage Vout and charge/discharge capacitor voltage Vcf. Similarly, when the switching element S1 is OFF and the switching element S4 is ON, voltage applied to the switching element S1 is a difference between output voltage Vout and charge/discharge capacitor voltage Vcf.

Before time T1, it is assumed that the output voltage target value Vout* is Vout1* and almost equal to output voltage Vout. Similarly, it is assumed that the value of target charge/discharge capacitor voltage Vcf* is Vcf1* and almost equal to charge/discharge capacitor voltage Vcf, and further, a state of Vcf1*=0.5×Vout1* is maintained.

At time T1, sharp change in the command value occurs so that the output voltage target value Vout* changes from Vout1* to Vout2*. At time T2, output voltage Vout reaches Vout2* and charge/discharge capacitor voltage Vcf also reaches Vcf2*, and thus operation due to the change in the command value is completed.

At time T1, when sharp change in the command value occurs so that the output voltage target value Vout* changes from Vout1* to Vout2*, the first controller 25 outputs the first operation value so as to increase both ON duties for the switching element S1 and the switching element S2, in accordance with a difference (ΔVout) between Vout2* and Vout1*.

Meanwhile, the second controller 26 outputs the second operation value so as to increase the ON duty D1 for the switching element S1 and decrease the ON duty D2 for the switching element S2, in accordance with a difference between target charge/discharge capacitor voltage Vcf* (=0.5×Vout) and charge/discharge capacitor voltage Vcf.

In the case where the calculation speed of the first controller 25 and the calculation speed of the second controller 26 do not coincide with each other and the calculation process of the second controller 26 is delayed as compared to the first controller 25, or in the case where the calculation result of the first controller 25 is 1 or 0 or a value close to these values and the second operation value is not entirely reflected in the ON duties, during the transient period from time T1 to time T2, output voltage Vout×0.5>charge/discharge capacitor voltage Vcf is satisfied, and maximum difference voltage ΔVmax1 between output voltage Vout and charge/discharge capacitor voltage Vcf occurs.

Therefore, in designing of the conventional DC/DC converter, it is necessary to select switching elements having a withstand voltage of ΔVmax1 or greater, in consideration of the maximum difference voltage ΔVmax1.

Next, with reference to FIG. 8, temporal changes in output voltage Vout and charge/discharge capacitor voltage Vcf in the present embodiment 1 will be described. As in FIG. 9, in FIG. 8, the horizontal axis indicates temporal change, and the vertical axis indicates the voltage value. In FIG. 8, one of thick lines indicates change in charge/discharge capacitor voltage Vcf, and the other thick line indicates change in output voltage Vout. In addition, one of thin lines indicates change in target charge/discharge capacitor voltage Vcf*, and the other thin line indicates change in the output voltage target value Vout*. In addition, a dotted line indicates change in the output voltage provisional target value Vout**.

As in the conventional DC/DC converter, voltage applied to the switching element S4 when the switching element S1 is ON and the switching element S4 is OFF, and voltage applied to the switching element S1 when the switching element S1 is OFF and the switching element S4 is ON, are a difference between output voltage Vout and charge/discharge capacitor voltage Vcf. In addition, the same condition as in the conventional DC/DC converter applies for time T1 and time T2.

At time T1, when sharp change in the command value occurs so that the output voltage target value Vout* changes from Vout1* to Vout2*, the first controller 25 outputs the first operation value so as to increase both ON duties for the switching element S1 and the switching element S2, in accordance with a difference (ΔVout) between the output voltage provisional target value Vout and output voltage Vout. Since the output voltage provisional target value Vout is charge/discharge capacitor voltage Vcf×2, the outputted first operation value is not a value greatly away from charge/discharge capacitor voltage Vcf, as compared to the conventional method.

Meanwhile, the second controller 26 outputs the second operation value so as to increase the ON duty D1 for the switching element S1 and decrease the ON duty D2 for the switching element S2, in accordance with a difference between target charge/discharge capacitor voltage Vcf* (=0.5×Vout*) and charge/discharge capacitor voltage Vcf.

Therefore, even in the case where the calculation process of the second controller 26 which performs a complicated calculation process is delayed as compared to the first controller 25, the actual change in the command value for the first controller 25 is from Vout1* to the output voltage provisional target value Vout**, and therefore great change in the first operation value does not occur during the transient period from time T1 to time T2. Therefore, maximum difference voltage ΔVmax2 between output voltage Vout and charge/discharge capacitor voltage Vcf is smaller than the maximum difference voltage ΔVmax1 in the conventional DC/DC converter.

That is, in designing of the DC/DC converter in the present embodiment, it is sufficient to select switching elements having a withstand voltage of ΔVmax2 or greater, considering that the maximum difference voltage ΔVmax2 is ½ of the maximum value Vout*(max) of the output voltage target value Vout*.

Therefore, as compared to the case of conventional DC/DC converter, inexpensive switching elements can be selected, whereby the cost of the DC/DC converter can be reduced.

In the present embodiment 1, the first constant is set at 2, and the second constant is set at 0.5. However, in accordance with the withstand voltage or performance of the switching elements, the first constant may be set to be greater than 1, and the second constant may be set to be greater than 0 and not greater than 1, as appropriate.

As described above, in order to minimize ripple current of the reactor, it is sometimes desirable to set the first constant at 1.9 to 2.1, and set the second constant at 0.4 to 0.6.

In the present embodiment 1, an advantage in the case where the output voltage target value Vout* sharply changes has been described. However, for example, also in the case where a difference between the output voltage target value Vout* and output voltage Vout becomes great at the time of starting the DC/DC converter in embodiment 1, a difference between output voltage Vout and charge/discharge capacitor voltage Vcf does not expand beyond assumption (Vout*(max)×0.5), and therefore the same effect is obtained.

Further, in the DC/DC converter in the present embodiment 1, also in the case of adopting an operation method in which the switching elements S3 and S4 are always switched ON to perform power transmission between the battery 2 and the electric motor 3 without switching, a difference between output voltage Vout and charge/discharge capacitor voltage Vcf does not expand beyond assumption (Vout*(max)×0.5) even when this operation is shifted to the step-up operation using switching, and therefore the same effect is obtained.

The reactor current IL flowing through the reactor 12 may be estimated from the change amount of the charge/discharge capacitor voltage Vcf. As shown in FIG. 4 to FIG. 7, charge/discharge capacitor voltage Vcf during the period of mode 1 increases in power-running operation and decreases in regeneration operation. Similarly, charge/discharge capacitor voltage Vcf during the period of mode 2 decreases in power-running operation and increases in regeneration operation. Thus, if charge/discharge capacitor voltage Vcf during the period of mode 1 increases, it can be estimated that the operation is power-running operation and reactor current IL is positive, and on the other hand, if charge/discharge capacitor voltage Vcf during the period of mode 1 decreases, it can be estimated that the operation is regeneration operation and reactor current IL is negative. Such a configuration makes it possible to control charge/discharge capacitor voltage Vcf to be a desired value, in power-running operation and in regeneration operation, without using an expensive current sensor.

Embodiment 2

Figure 10:
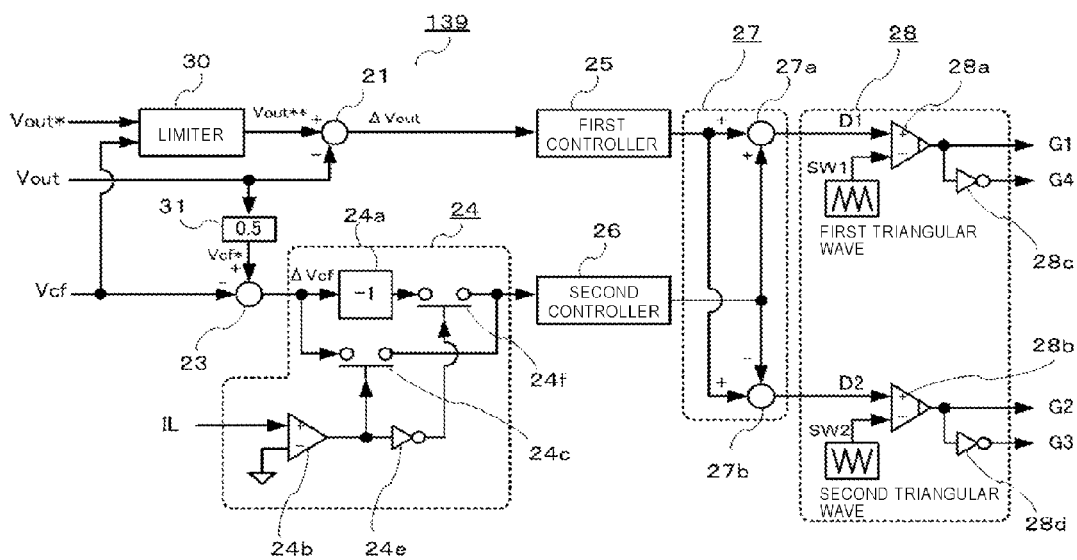
FIG. 10 is a circuit diagram showing the configuration of a control device in embodiment 2.
Figure 11:
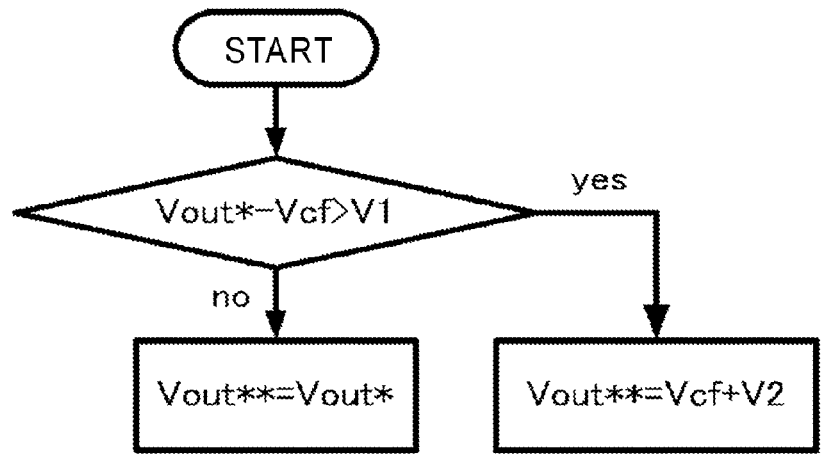
FIG. 11 is an operation flowchart of a limiter 30 of the control device in embodiment 2.
Figure 12:
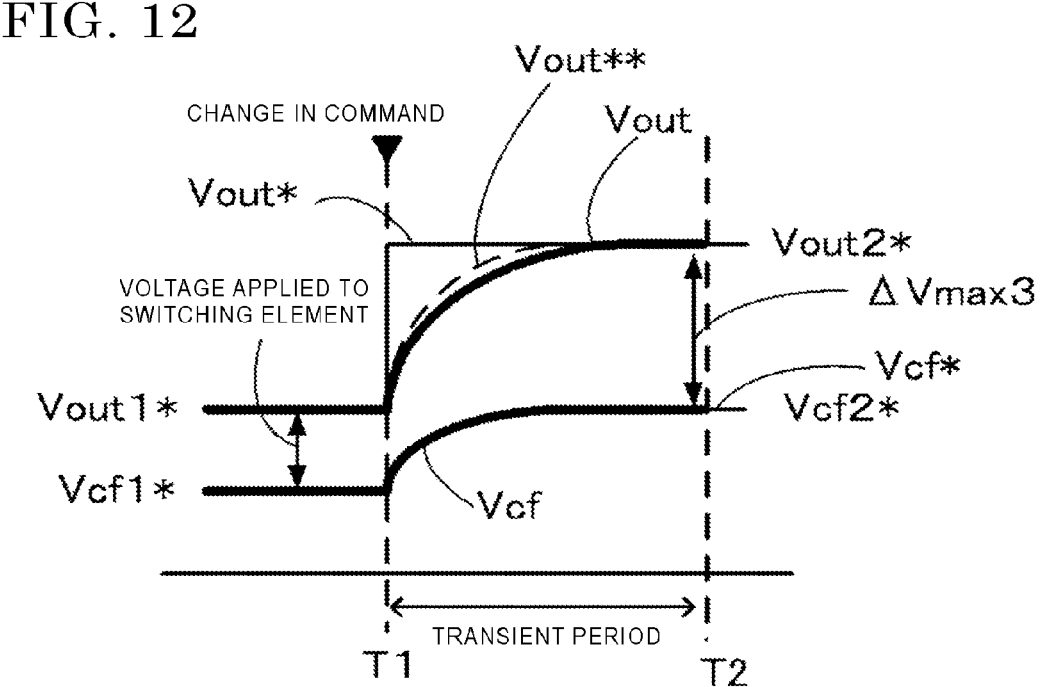
FIG. 12 is a diagram illustrating temporal changes in output voltage Vout and charge/discharge capacitor voltage Vcf in embodiment 2.

A DC/DC converter according to embodiment 2 of the present invention will be described. The configuration of the DC/DC converter in the present embodiment 2 is the same as in embodiment 1. FIG. 10 is a circuit diagram showing the configuration of a control device, FIG. 11 is an operation flowchart of a limiter 30 of the control device, and FIG. 12 is a diagram illustrating temporal changes in output voltage Vout and charge/discharge capacitor voltage Vcf. The same numerals or the same characters as those in FIGS. 1 and 2 denote components that are the same as or equivalent to those shown in embodiment 1, and therefore the detailed description thereof is omitted.

FIG. 10 is a circuit diagram showing the detailed configuration of a control device 139. In FIG. 10, the control device 139 includes the subtractor 21, the subtractor 23, the first control block 24, the first controller 25, the second controller 26, the second control block 27, the third control block 28, the limiter 30, and a multiplier 31. The first control block 24 includes the multiplier 24a, the comparator 24b, the open/close contact 24c, the inverter 24e, and the open/close contact 24f. The second control block 27 includes the adder 27a and the subtractor 27b. The third control block 28 includes the comparator 28a, the comparator 28b, the inverter 28c, and the inverter 28d. The limiter 30, the subtractor 21, and the first controller 25 correspond to the first operation unit in the present invention. The multiplier 31, the subtractor 23, the first control block 24, and the second controller 26 correspond to the second operation unit in the present invention. The second control block 27 and the third control block 28 correspond to the switching control unit in the present invention. The comparator 24b corresponds to the reactor current direction detection unit in the present invention.

FIG. 11 is an operation flowchart of the limiter 30. First, the output voltage target value Vout* and charge/discharge capacitor voltage Vcf are inputted to the limiter 30. Next, whether or not a difference between the output voltage target value Vout* and charge/discharge capacitor voltage Vcf is greater than a predetermined voltage value V1 is determined. Then, if the difference between the output voltage target value Vout* and charge/discharge capacitor voltage Vcf is greater than the predetermined voltage value V1, the limiter 30 outputs a sum of charge/discharge capacitor voltage Vcf and a predetermined voltage value V2, as the output voltage provisional target value Vout**. On the other hand, if the difference between the output voltage target value Vout* and charge/discharge capacitor voltage Vcf is equal to or smaller than the predetermined voltage value V1, the limiter 30 outputs the output voltage target value Vout* as the output voltage provisional target value Vout**.

If the voltage value V1 is set to be equal to or smaller than the withstand voltage of the switching elements, and the voltage value V2 is set to be equal to or smaller than the voltage value V1, the output voltage provisional target value Vout** does not greatly change as compared to the output voltage Vout, and voltage applied to each switching element can be made equal to or smaller than the withstand voltage of the switching elements.

The voltage value V1 is a first voltage value in the present invention, and the voltage value V2 is a second voltage value in the present invention.

The voltage detection value of the charge/discharge capacitor detected by the voltage sensor 104 is inputted as charge/discharge capacitor voltage Vcf to the limiter 30. The output voltage target value Vout* is also inputted to the limiter 30. As described above, the output voltage provisional target value Vout** is calculated by the limiter 30.

The output voltage provisional target value Vout**, and output voltage Vout which is the detection value of the high-voltage-side voltage detected by the voltage sensor 103, are inputted to the subtractor 21, and then the difference therebetween, i.e., difference voltage ΔVout, is inputted to the first controller 25.

In addition, output voltage Vout is multiplied by 0.5 by the multiplier 31 with a multiplication constant set at 0.5, to calculate the charge/discharge capacitor voltage target value Vcf* as a voltage command value for the charge/discharge capacitor.

The charge/discharge capacitor voltage target value Vcf* and charge/discharge capacitor voltage Vcf are inputted to the subtractor 23, to calculate the difference therebetween, i.e., difference voltage ΔVcf, which is outputted to the first control block 24.

The output voltage provisional target value Vout** and the multiplication constant of 0.5 are respectively the first calculated value and a fourth constant which indicate the characteristics of the present invention. Similarly, the target charge/discharge capacitor voltage Vcf* is a fourth calculated value which indicates the characteristics of the present invention.

In the first control block 24, reactor current IL detected by the current sensor 105 is inputted to the comparator 24b, and the open/close contacts 24c, 24f are opened or closed in accordance with the polarity of the reactor current IL, thereby switching the polarity of difference voltage ΔVcf between the charge/discharge capacitor voltage target value Vcf* and the charge/discharge capacitor voltage Vcf. When reactor current IL is positive, the difference voltage ΔVcf is outputted as it is, and when reactor current IL is negative, the difference voltage ΔVcf is multiplied by −1 by the multiplier 24a to invert the polarity thereof, and then outputted to the second controller 26 by the open/close contact 24f being closed via the inverter 24e. Output of the first controller 25 as the first operation value and output of the second controller 26 as the second operation value are inputted to the second control block 27. These values are added by the adder 27a and the resultant value is outputted to the third control block 28, as the ON duty D1 which is a current conduction rate for the switching element S1. In addition, a difference between output of the first controller 25 and output of the second controller 26 is calculated by the subtractor 27b, and is outputted to the third control block 28, as the ON duty D2 which is a current conduction rate for the switching element S2.

The other operation is the same as in embodiment 1, and as described above, it becomes possible to control output voltage Vout to be the output voltage target value Vout*, and control charge/discharge capacitor voltage Vcf to be the target charge/discharge capacitor voltage Vcf*, irrespective of whether power-running operation or regeneration operation is performed. In addition, the current sensor 105 only needs to have a function of determining the polarity of current flowing through the reactor 12, and therefore an inexpensive sensor can be used as the current sensor 105, whereby the control device of the DC/DC converter can be configured at low cost.

Next, with reference to FIG. 12, temporal changes in output voltage Vout and charge/discharge capacitor voltage Vcf in the present embodiment 1 will be described. As in FIG. 9, in FIG. 12, the horizontal axis indicates temporal change, and the vertical axis indicates the voltage value. In FIG. 12, one of thick lines indicates change in charge/discharge capacitor voltage Vcf, and the other thick line indicates change in output voltage Vout. In addition, one of thin lines indicates change in target charge/discharge capacitor voltage Vcf*, and the other thin line indicates change in the output voltage target value Vout*. In addition, a dotted line indicates change in the output voltage provisional target value Vout**.

As in the conventional DC/DC converter, voltage applied to the switching element S4 when the switching element S1 is ON and the switching element S4 is OFF, and voltage applied to the switching element S1 when the switching element S1 is OFF and the switching element S4 is ON, are a difference between output voltage Vout and charge/discharge capacitor voltage Vcf. In addition, the same condition as in the conventional DC/DC converter applies for time T1 and time T2.

At time T1, when sharp change in the command value occurs so that the output voltage target value Vout* changes from Vout1* to Vout2*, the first controller 25 outputs the first operation value so as to increase both ON duties for the switching element S1 and the switching element S2, in accordance with a difference (ΔVout) between the output voltage provisional target value Vout and output voltage Vout. Since the output voltage provisional target value Vout is calculated by the limiter 30 and is limited by the charge/discharge capacitor voltage Vcf, the first operation value does not greatly change, as compared to the case of conventional DC/DC converter.

Meanwhile, the second controller 26 outputs the second operation value so as to increase the ON duty D1 for the switching element S1 and decrease the ON duty D2 for the switching element S2, in accordance with a difference between target charge/discharge capacitor voltage Vcf* (=0.5×Vout) and charge/discharge capacitor voltage Vcf.

Therefore, even in the case where the calculation process of the second controller 26 is delayed as compared to the first controller 25, the actual change in the command value for the first controller 25 is from Vout* to the output voltage provisional target value Vout**, and therefore great change in the first operation value does not occur during the transient period from time T1 to time T2. Therefore, maximum difference voltage ΔVmax3 between output voltage Vout and charge/discharge capacitor voltage Vcf is smaller than the maximum difference voltage ΔVmax1 in the conventional DC/DC converter.

That is, in designing of the DC/DC converter in the present embodiment, it is sufficient to select switching elements having a withstand voltage equal to or greater than the voltage value V1, in consideration of being not greater than the voltage value V1.

Therefore, as compared to the conventional method, inexpensive switching elements can be selected, whereby the cost of the DC/DC converter can be reduced.

In the present embodiment 2, an advantage in the case where the output voltage target value Vout* sharply changes has been described. However, for example, also in the case where a difference between the output voltage target value Vout* and output voltage Vout becomes great at the time of starting the DC/DC converter in embodiment 2, a difference between output voltage Vout and charge/discharge capacitor voltage Vcf does not expand beyond V1, and therefore the same effect is obtained.

Further, in the DC/DC converter in the present embodiment 2, also in the case of adopting an operation method in which the switching elements S3 and S4 are always switched ON to perform power transmission between the battery 2 and the electric motor 3 without switching, a difference between output voltage Vout and charge/discharge capacitor voltage Vcf does not expand beyond the voltage value V1 even when this operation is shifted to the step-up operation using switching, and therefore the same effect is obtained.

In the above embodiments, the case where the switching elements S1 to S4 are IGBTs has been described, but MOSFETs, JFETs, or the like may be used for the switching elements. The switching elements and/or the diode elements may be formed from wide bandgap semiconductors having a larger band gap than silicon. Examples of wide bandgap semiconductors include silicon carbide (SiC), a gallium-nitride-based material, and diamond. The switching elements and diode elements (diodes) formed from wide bandgap semiconductors have a high withstand voltage and also have a high allowable current density, and therefore allow size reduction of the switching elements and the diode elements. Therefore, by using these downsized switching elements and diode elements, it becomes possible to reduce the size of a semiconductor module including these elements. In addition, since the heat resistance thereof is also high, a heat dissipation fin of a heatsink can be downsized and a water-cooling unit can be changed into an air-cooling type, whereby it is possible to further reduce the size of the semiconductor module. Further, since the power loss is also low, the efficiency of the switching elements and the diode elements can be enhanced, leading to enhancement of the efficiency of the semiconductor module. Both the switching element and the diode element may be formed from wide bandgap semiconductors, or one of the switching element and the diode element may be formed from a wide bandgap semiconductor. In any case, the effects as described in the above embodiments can be obtained.

It is noted that, within the scope of the present invention, the above embodiments may be freely combined with each other, or each of the above embodiments may be modified or simplified as appropriate.

DESCRIPTION OF THE REFERENCE CHARACTERS 11 low-voltage-side smoothing capacitor
12 reactor
21 subtractor
22 multiplier
23 subtractor
24 first control block
25 first controller
26 first controller
27 second control block
28 third control block
29 multiplier
30 limiter
31 multiplier
101f charge/discharge capacitor
103 voltage sensor
104 voltage sensor
108 high-voltage-side smoothing capacitor
109 control device
S1 to S4 switching element

The invention claimed is:
1. A DC/DC converter comprising:
a low-voltage-side smoothing capacitor holding low-voltage-side voltage;
a high-voltage-side smoothing capacitor holding high-voltage-side voltage and having a negative-side terminal connected to a negative-side terminal of the low-voltage-side smoothing capacitor;
a first semiconductor circuit having an end connected to the negative-side terminal of the low-voltage-side smoothing capacitor;
a second semiconductor circuit having an end connected to another end of the first semiconductor circuit, and another end connected to a positive-side terminal of the low-voltage-side smoothing capacitor via a reactor;
a third semiconductor circuit having an end connected to the other end of the second semiconductor circuit;
a fourth semiconductor circuit having an end connected to another end of the third semiconductor circuit, and another end connected to a positive-side terminal of the high-voltage-side smoothing capacitor;
a charge/discharge capacitor having an end connected to an intermediate connection point of the first semiconductor circuit and the second semiconductor circuit, and another end connected to an intermediate connection point of the third semiconductor circuit and the fourth semiconductor circuit; and
a control device for controlling the semiconductor circuits,
the DC/DC converter being capable of at least one of:
a step-up operation in which
the first and second semiconductor circuits are both caused to have switching element functions,
the third and fourth semiconductor circuits are both caused to have diode element functions, and
by switching-element ON/OFF-switching functions provided to the first and second semiconductor circuits, voltage of the low-voltage-side smoothing capacitor that is inputted is converted to stepped-up voltage, and the stepped-up voltage is outputted to the high-voltage-side smoothing capacitor; and
a step-down operation in which
the third and fourth semiconductor circuits are both caused to have switching element functions,
the first and second semiconductor circuits are both caused to have diode element functions, and
by switching-element ON/OFF-switching functions provided to the third and fourth semiconductor circuits, voltage of the high-voltage-side smoothing capacitor that is inputted is converted to stepped-down voltage, and the stepped-down voltage is outputted to the low-voltage-side smoothing capacitor, wherein
the control device includes a first operation unit, a second operation unit, and a switching control unit,
the first operation unit calculates a first calculated value by multiplying a detection value of voltage of the charge/discharge capacitor by a predetermined first constant, and calculates a first operation value on the basis of difference voltage between the first calculated value and a detection value of the high-voltage-side voltage,
the second operation unit calculates a second operation value on the basis of difference voltage between a second calculated value calculated on the basis of a command value for the high-voltage-side voltage, and the detection value of voltage of the charge/discharge capacitor, and
the switching control unit calculates a current conduction rate on the basis of the first operation value and the second operation value, and controls, on the basis of the current conduction rate, switching operations of the first and second semiconductor circuits caused to have the ON/OFF-switching functions or of the third and fourth semiconductor circuits caused to have the

ON/OFF-switching functions, thereby controlling the high-voltage-side voltage or the low-voltage-side voltage, and voltage of the charge/discharge capacitor.

2. The DC/DC converter according to claim 1, wherein the second calculated value is a value obtained by multiplying the command value for the high-voltage-side voltage by a predetermined second constant.

3. A DC/DC converter comprising:
a low-voltage-side smoothing capacitor holding low-voltage-side voltage;
a high-voltage-side smoothing capacitor holding high-voltage-side voltage and having a negative-side terminal connected to a negative-side terminal of the low-voltage-side smoothing capacitor;
a first semiconductor circuit having an end connected to the negative-side terminal of the low-voltage-side smoothing capacitor;
a second semiconductor circuit having an end connected to another end of the first semiconductor circuit, and another end connected to a positive-side terminal of the low-voltage-side smoothing capacitor via a reactor;
a third semiconductor circuit having an end connected to the other end of the second semiconductor circuit;
a fourth semiconductor circuit having an end connected to another end of the third semiconductor circuit, and another end connected to a positive-side terminal of the high-voltage-side smoothing capacitor;
a charge/discharge capacitor having an end connected to an intermediate connection point of the first semiconductor circuit and the second semiconductor circuit, and another end connected to an intermediate connection point of the third semiconductor circuit and the fourth semiconductor circuit; and
a control device for controlling the semiconductor circuits,
the DC/DC converter being capable of at least one of:
a step-up operation in which
the first and second semiconductor circuits are both caused to have switching element functions,
the third and fourth semiconductor circuits are both caused to have diode element functions, and
by switching-element ON/OFF-switching functions provided to the first and second semiconductor circuits, voltage of the low-voltage-side smoothing capacitor that is inputted is converted to stepped-up voltage, and the stepped-up voltage is outputted to the high-voltage-side smoothing capacitor; and
a step-down operation in which
the third and fourth semiconductor circuits are both caused to have switching element functions,
the first and second semiconductor circuits are both caused to have diode element functions, and
by switching-element ON/OFF-switching functions provided to the third and fourth semiconductor circuits, voltage of the high-voltage-side smoothing capacitor that is inputted is converted to stepped-down voltage, and the stepped-down voltage is outputted to the low-voltage-side smoothing capacitor, wherein
the control device includes a first operation unit, a second operation unit, and a switching control unit,
the first operation unit calculates a first operation value on the basis of difference voltage between a detection value of the high-voltage-side voltage and a third calculated value calculated on the basis of difference voltage between a command value for the high-voltage-side voltage and a detection value of voltage of the charge/discharge capacitor,
the second operation unit calculates a second operation value on the basis of difference voltage between a fourth calculated value calculated on the basis of a detection value of voltage of the high-voltage-side smoothing capacitor, and the detection value of voltage of the charge/discharge capacitor, and
the switching control unit calculates a current conduction rate on the basis of the first operation value and the second operation value, and controls, on the basis of the current conduction rate, switching operations of the first and second semiconductor circuits caused to have the ON/OFF-switching functions or of the third and fourth semiconductor circuits caused to have the ON/OFF-switching functions, thereby controlling the high-voltage-side voltage or the low-voltage-side voltage, and voltage of the charge/discharge capacitor.

4. The DC/DC converter according to claim 3, wherein when a difference between the command value for the high-voltage-side voltage and the detection value of voltage of the charge/discharge capacitor is greater than a predetermined first voltage value, the third calculated value is a sum of the detection value of voltage of the charge/discharge capacitor and a predetermined second voltage value, and when a difference between the command value for the high-voltage-side voltage and the detection value of voltage of the charge/discharge capacitor is equal to or smaller than the predetermined first voltage value, the third calculated value is the command value for the high-voltage-side voltage.

5. The DC/DC converter according to claim 3, wherein the fourth calculated value is a value obtained by multiplying the detection value of voltage of the high-voltage-side smoothing capacitor by a predetermined fourth constant.

6. The DC/DC converter according to claim 1, wherein all the first to fourth semiconductor circuits have switching element functions, and
the control device performs switching control of the first to fourth semiconductor circuits.

7. The DC/DC converter according to claim 1, wherein when the first and second semiconductor circuits have switching functions, the third and fourth semiconductor circuits are unidirectional conduction elements or synchronous rectification circuits, and when the third and fourth semiconductor circuits have switching functions, the first and second semiconductor circuits are unidirectional conduction elements or synchronous rectification circuits.

8. The DC/DC converter according to claim 1, wherein the switching control unit calculates the current conduction rate on the basis of an addition value of the first operation value and the second operation value, and a subtraction value of the first operation value and the second operation value.

9. The DC/DC converter according to claim 1, further comprising a reactor current determination unit for determining a magnitude of current flowing through the reactor, wherein
the second operation unit changes a magnitude of the second operation value in accordance with a result of determination by the reactor current determination unit.

10. The DC/DC converter according to claim 1, further comprising a reactor current direction detection unit for detecting a direction of current flowing through the reactor, and the second operation unit changes a polarity of the second operation value in accordance with a result of detection by the reactor current direction detection unit.

11. The DC/DC converter according to claim 10, wherein the reactor current direction detection unit detects the direction of current flowing through the reactor on the basis of operation states of the semiconductor circuits and voltage change in the charge/discharge capacitor.

12. The DC/DC converter according to claim 1, wherein the semiconductor circuits include semiconductor elements formed from wide bandgap semiconductors.

13. The DC/DC converter according to claim 12, wherein the wide bandgap semiconductors are silicon carbide, a gallium-nitride-based material, or diamond.

* * * * *